Aug. 3, 1937.                    R. G. AREY                    2,089,083
AMMETER
Filed July 11, 1936
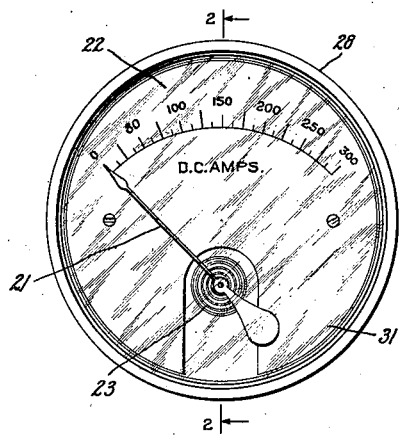
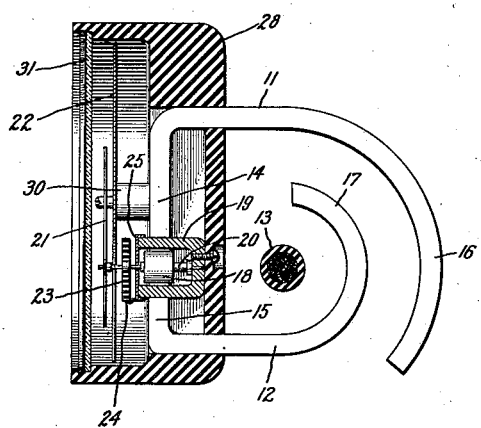
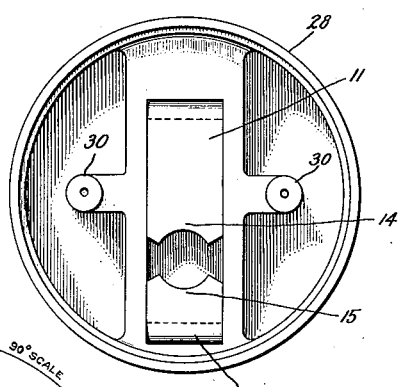
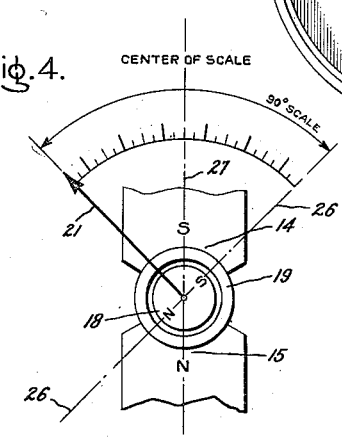
Inventor:
Ralph G. Arey,
by Harry E. Dunham
His Attorney.

Patented Aug. 3, 1937

2,089,083

UNITED STATES PATENT OFFICE 2,089,083

AMMETER

Ralph G. Arey, Swampscott, Mass., assignor to General Electric Company, a corporation of New York Application July 11, 1936, Serial No. 90,137

5 Claims. (Cl. 171—95)

My invention relates to current responsive devices and concerns particularly direct current responsive instruments.

It is an object of my invention to provide a sturdy reliable current responsive device having a high torque. Another object is to provide a removable device suitable for measuring current flowing in a conductor without breaking the current connections of the conductor or disturbing its insulation if insulated. Still another object is the measurement of direct currents of the order of 500 to 1000 amperes without the use of a shunt.

A more specific object of my invention is to provide an instrument suitable for measuring the starting current of automobile engine starting motors by slipping a portion of the instrument over the starter cable. Other and further objects and advantages will become apparent as the description proceeds.

In carrying out my invention in its preferred form, I provide a pair of magnetizable flux conducting members with wings adapted to be brought around the conductor in which the current is flowing for the purpose of forming a magnetic circuit. I provide a suitable flux indicator which is responsive to the magnetic flux flowing through the wings to give an indication of the current flowing in the electrical conductor.

The invention will be understood more readily from the following detailed description when considered in connection with the accompanying drawing and those features of the invention which are believed to be novel and patentable will be pointed out in the claims appended hereto. In the drawing Fig. 1 is a face view of one embodiment of my invention; Fig. 2 is a view principally in cross section showing the portions of the apparatus cut by the vertical plane 2—2 of Fig. 1; Fig. 3 is a view corresponding to Fig. 1 with all the parts removed except the case and the field structure; and Fig. 4 is a schematic diagram illustrating the principle of operation of the flux detector. Like reference characters are utilized throughout the drawing to designate like parts.

Referring now more in detail to the drawing, in the form of my invention illustrated, I employ a flux conductor or collector consisting of a pair of magnetizable members 11 and 12 adapted to surround an electrical conductor such as an insulated cable 13 in which is flowing the current to be measured. A suitable element responsive to the magnetic flux in the members 11 and 12 is provided, preferably in an air gap between pole portions 14 and 15 of the members 11 and 12 respectively.

The magnetizable members 11 and 12 forming the field structure may consist of strips of any suitable magnetizable material each having one end bent toward the corresponding end of the other to form the pole portions 14 and 15 with a gap between them. The opposite ends of the members 11 and 12 are curved around the point or the position which is to be occupied by the cable 13 to form flux collecting wings 16 and 17. The wings 16 and 17 may, if desired, lie along arcs of circles substantially concentric with the cross section of the cable 13 and are spaced sufficiently to permit the cable 13 to be slipped into or out of the loop formed by the curved portions 16 and 17 without breaking the connections of the cable 13 or disturbing its insulation. It will be seen that the winged portions 16 and 17 of the members 11 and 12 are each curved toward the other member and that the winged portions overlap over appreciable arcs in order that the instrument will pick up substantially all of the magnetic field surrounding the conductor 13 and will provide a sufficiently low reluctance magnetic path with respect to the flux set up by current in cable 13 to insure setting up ample flux in the members 11 and 12. Preferably a highly permeable magnetic material is employed for the members 11 and 12. Cold rolled steel is satisfactory in the case of instruments for measuring automobile starter currents.

The flux detector may consist of a magnetized rotor 18 pivotally mounted in the gap between the pole portions 14 and 15. If desired, in order to provide damping, a damping ring or damping cup 19 of non-magnetic conducting material may surround the rotor 18. If the damping cup 19 is employed, it serves as a convenient mechanical arrangement for mounting the flux detector. A shaft 20 is pivotally mounted within the damping cup 19 coaxial therewith and carries the rotor 18 as well as a pointer 21 cooperating with a scale 22. A biasing spring 23 may also be provided which is attached at one end to the shaft 20 and at the other end to a stationary portion of the apparatus, for example, to a bracket 24 fastened to a non-magnetic cap 25 covering the open end of the damping cup 19. The cap 25 engages the cup 19 with a friction grip and may be rotated to effect an adjustment of the zero position of the pointer 21. Owing to the high torque obtained it is unnecessary to provide jeweled pivots and the shaft 20 may, if desired, be journaled in the cap 25 and in the closed end of the cup 19.

The rotor or armature 18 is preferably substantially cylindrical in shape or has a circular cross section and conforms substantially in shape to the confronting faces of the pole portions 14 and 15 and the inner lateral surfaces of the damping cup 19.

The rotor 18 is tranversely magnetized and for the sake of maximum torque it is composed of a high coercive force magnetic material. It may be composed of material such as cobalt steel or an alloy of iron and 6 to 15% aluminum and 20 to 30% nickel, for example. However, for the sake of obtaining increased lightness, reduction in inertia, elimination of the necessity for insulation and for obtaining maximum efficiency of utilization of magnet material, I prefer to employ material such as that described in the copending application of Ralph G. Arey and Harold T. Faus, Serial No. 50,508, filed November 19, 1935, and assigned to the same assignee as the present application. When composed of this material the rotor consists of a solid block of circular cross section which is polarized across the diameter thereof. The material is prepared and magnetized as follows:

Mix together finely powdered magnetite, ferric oxide and cobaltic oxide in the proportions of 43.6% magnetite, 30.1% ferric oxide and 26.3% cobaltic oxide. Mold the mixture in the shape desired under a pressure of 3 to 5 tons per square inch. Remove from the mold and heat in an atmosphere of nitrogen or air for 2 or 3 hours at about 1000° C. and allow to cool. Then reheat to about 520° C. in a special furnace placed in the air gap of a direct current electromagnet with a field of about 3000H. With the field on, lower the temperature to about 300 or 320° C. and hold in the field within this range of temperature for about ¾ of an hour. Then allow to cool in the field to below 100° C. The material may then be machined or ground to shape if necessary.

Such sintered oxide material after being magnetized in addition to being a permanent magnet of exceptionally high coercive force has other remarkable properties. It has a resistance of between 600,000 and 1,000,000 ohms per centimeter cube, that is thus practically an insulator. It is very light in weight as compared to other materials, having a specific gravity approximately ½ that of ordinary steel. The coercive force of the material prepared as previously described is between 700 and 1,000 oersteds.

Since the line of polarization is very definite and does not shift and the cylindrical magnet behaves just as if it were a thin line permanent magnet, the position assumed by the pointer is very definite.

I prefer to make the diameter of the rotor about twice its axial thickness as this appears to represent approximately the most efficient design of permanent magnet for the shape and material used. In order to give a clear understanding of this statement, it may be said that the most efficient design of a cobalt steel bar magnet is one having a ratio of length to diameter of the bar of about 8:1. Due to the higher coercive force and lower residual induction of the sintered oxide material used in my rotor, the most efficient design of the bar magnet made thereof is with a ratio of length to diameter of about 2:1. It thus becomes evident that the solid cylindrical rotor of sintered oxide having a diameter of about twice its axial thickness and polarized across the diameter thereof is an efficient permanent magnet, which lends itself much more readily to a compact design with minimum leakage than would a rotor which cannot efficiently occupy the small space that must be provided between the field pole faces.

It might be expected that variations in the position of the cable 13 within the loop formed by the magnetized members 11 and 12 would cause some slight variation in angular position of the pointer 21. However, owing to the fact that the effective reluctance of the magnetic circuit is substantially the same regardless of the exact position of the cable 13 as both wings 16 and 17 extend well around the cable 13, I find that any discrepancies in the position of the pointer 21 which may result from variations in the exact position of the cable 13 are negligible. For the principal purpose intended, measuring starting current in automobile starters, I find it unnecessary to provide any means for insuring precise positioning of the magnetizable member with respect to the conductor 13. However, if desired, suitable clamps or guides may be attached to the instrument case or to the magnetizable members 11 and 12 for positioning the conductor 13.

If a maximum angle of deflection is desired points of attachment of the shaft 20 to the biasing spring 23 and to the pointer 21 may be such that for the zero indication, the line of polarization of the rotor 18 is nearly in line with the pole portions 14 and 15 and the poles of the rotor and field structure oppose. Ordinarily a 90° scale is sufficient and I find that the best scale distribution and highest sensitivity may be obtained by attaching the biasing spring 23 at such a position on the shaft 20 that the line of polarization 26 of the rotor is substantially at right angles to the line of symmetry 27 joining the pole portions 14 and 15 when the pointer 21 is in its center scale position. For the zero position in an instrument having a 90° scale the line of polarization 26 of the rotor will then be at 45° to the line of symmetry 27 of the field, as shown in Fig. 4.

It will be apparent that the current flowing through the conductor 13 produces a magnetic field surrounding it which induces a magnetic flux in the members 11 and 12 which flux also flows across the air gap between the pole portions 14 and 15 and reacts upon the permanently magnetized rotor 18. The magnetic poles at 14 and 15 tend to attract the points of opposite polarity on the rotor 18 and thus tend to rotate the latter against the force of the biasing spring 23. Furthermore, the flux produced by the poles of the rotor 18 cuts across the material comprising the cylindrical portion of the damping cup 19 when the rotor 18 deflects and consequently induces eddy current in the cup 19 serving to provide rotor damping by the reaction of the eddy currents on the rotor in a manner which is well known to those skilled in the art. In automobile starters, currents from 50 to 600 amperes are involved and therefore so much torque is produced that a relatively strong control spring should be used.

For the sake of obtaining a compact and strong mechanical assembly, I may provide a combined base and casing 28 molded from any suitable material such as a phenolic condensation product. The magnetizable members 11 and 12 may be molded into the casing 28 by inserting them in the die when the casing 28 is molded, or suitable spaces may be provided for inserting these pieces after the casing has been molded. The damping cup 19 is attached to the back of the case 28 by screws. The scale plate 22 is screwed to bosses 30 molded in the casing 28, and a cover glass 31 is fastened in a suitable manner in the open face of the case 28.

In accordance with the provisions of the patent statutes, I have described the principle of operation of my invention together with the apparatus I now believe to represent the best embodiment thereof, but I desire to have it understood that the apparatus shown and described is only illustrative and that my invention may be carried out by other arrangements.

What I claim as new and desire to secure by Letters Patent of the United States, is:

1. A device responsive to direct current flowing through a conductor comprising in combination a pair of magnetizable members having pole portions extending towards each other with a gap between and having wing portions each curved toward the other member around a position to be occupied by the conductor and spaced from the other wing portion to permit insertion of the conductor without breaking its connections, a damping cup composed of electrically conducting material occupying the gap between said pole portions, a sintered oxide transversely magnetized cylinder pivotally mounted within said cup substantially coaxial therewith, and a biasing spring tending to retain said cylinder in a position with its line of magnetization at an angle to a line joining the pole portions of said magnetizable members.

2. A current responsive device comprising in combination a conductor adapted to carry a current, a pair of magnetizable members having pole portions extending toward each other with a gap between and having wing portions each curved toward the other member around said conductor and spaced from the other wing portion to permit insertion and removal of the conductor without breaking its connections, a rotor pivotally mounted within the gap between said pole portions magnetized transversely to its axis of rotation and with its axis of rotation transverse to a line joining said pole portions, and a biasing spring tending to oppose the force of attraction between said rotor and said pole portions.

3. A device responsive to current flowing through a conductor comprising in combination a pair of magnetizable members having pole portions extending toward each other with a gap between and having wing portions each curved toward the other member around the position to be occupied by the conductor and spaced from the other wing portion to permit insertion of the conductor without breaking its connections, a closed circuit damping member composed of electric conducting material occupying the gap between said portions, a transversely magnetized rotor of high coercive force material pivotally mounted within said damping member, and a biasing spring tending to rotate said rotor in opposition to the force of attraction of the pole portions of said magnetizable members.

4. A device responsive to current flowing through a conductor comprising in combination, a pair of magnetizable members having pole portions extending toward each other with a gap therebetween and having wing portions each curved toward the other member around a position to be occupied by the conductor and spaced from the other wing portion to permit insertion of the conductor without breaking its connections, and a pivotally mounted magnetized rotor in the gap between said pole portions.

5. A device responsive to current flowing through a conductor comprising in combination a pair of magnetizable members having pole portions extending toward each other with a gap therebetween and having wing portions each curved toward the other member around the position to be occupied by the conductor and spaced from the other wing portion to permit insertion of the conductor without breaking its connections, and in the gap between said pole portions a pivotally mounted flux responsive element.

RALPH G. AREY.